United States Patent
Thiele et al.

[15] 3,661,448
[45] May 9, 1972

[54] MOTION PICTURE CAMERA WITH MEANS PRODUCING A DISSOLVING EFFECT

[72] Inventors: Heinz Thiele, Leinfelden (Wurtt.); Dietrich Becker, Stuttgart-Mohringen, both of Germany

[73] Assignee: Zeiss Ikon Aktiengesellschaft, Stuttgart, Germany

[22] Filed: Apr. 16, 1970

[21] Appl. No.: 29,059

[30] Foreign Application Priority Data

Apr. 22, 1969 Germany..................P 19 20 439.8

[52] U.S. Cl. ........................................................352/91
[51] Int. Cl. ................................................G03b 21/36
[58] Field of Search.............................352/91, 217

[56] References Cited

UNITED STATES PATENTS

| | | |
|---|---|---|
| 3,549,249 | 12/1970 | Katsuyama..............................352/91 |
| 3,494,691 | 2/1970 | Katsuyama..............................352/91 |
| 3,514,197 | 5/1970 | Sho..........................................352/91 |

*Primary Examiner*—S. Clement Swisher
*Attorney*—Singer, Stern & Carlberg

[57] ABSTRACT

A motion picture camera having a motor operated adjustable diaphragm for the purpose of producing a dissolving effect is provided with means which gradually closes and again opens the diaphragm from an exposure aperture to the smallest aperture and vice versa and during this time period the film gripper withdraws a predetermined length of film from the delivery spool and after exposure moves the film back onto the delivery spool. The forward and rearward movement of the film takes place in relation to the decrease of the diaphragm aperture and the subsequent increase of the same.

3 Claims, 3 Drawing Figures

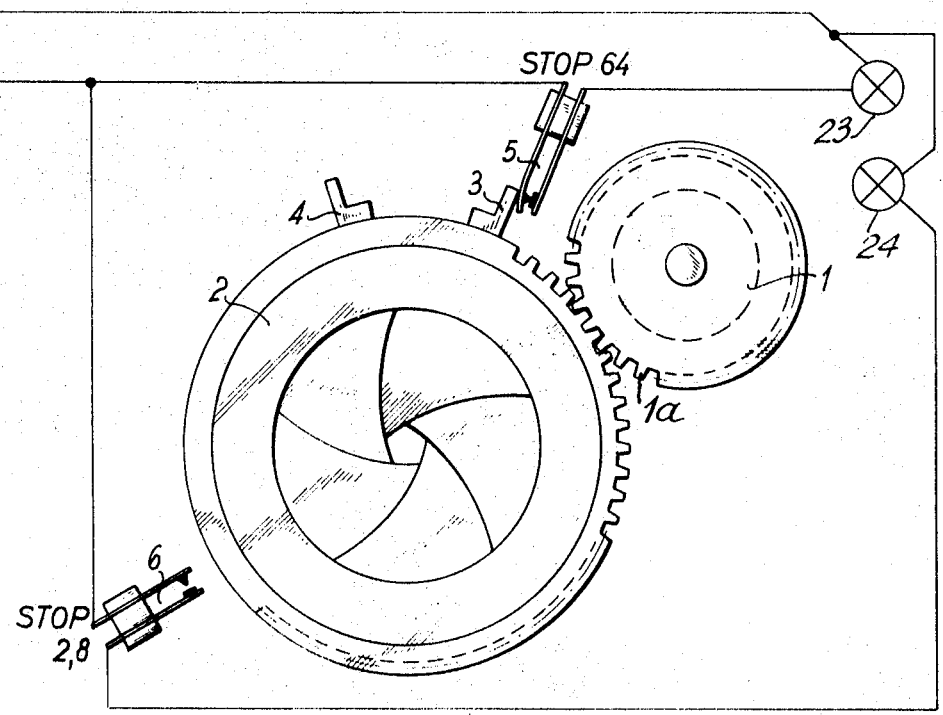
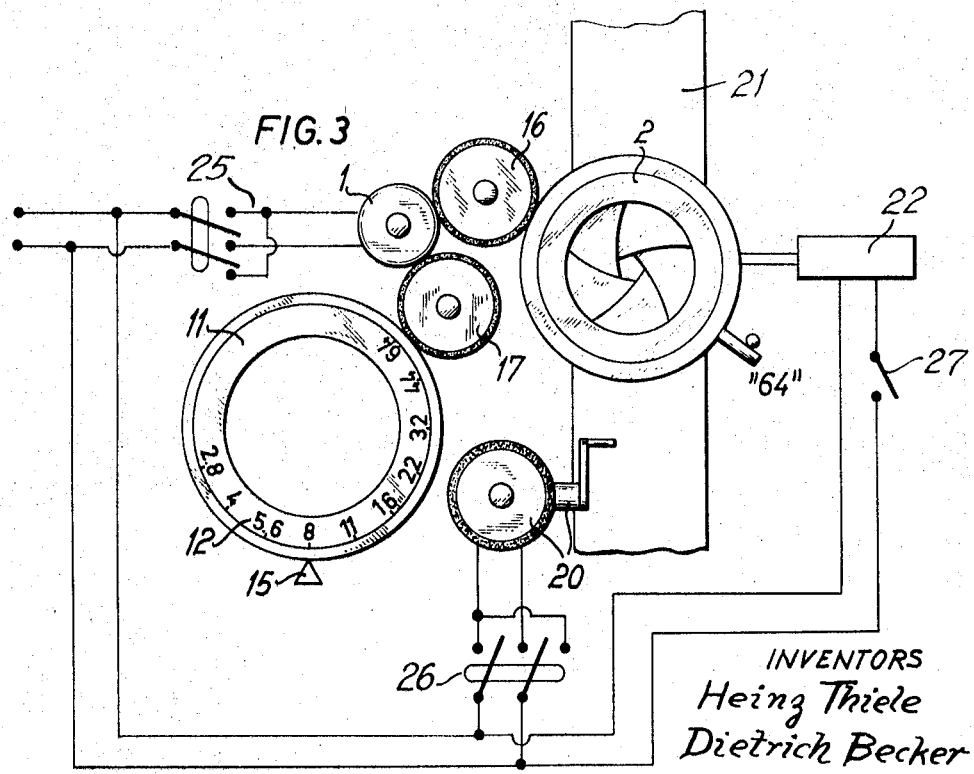

MOTION PICTURE CAMERA WITH MEANS PRODUCING A DISSOLVING EFFECT

The invention relates to improvements in motion picture cameras. When producing with a camera of this type a dissolving or fading effect, it is customary to withdraw first of all a portion of the film from the delivery spool and to expose this portion to the object to be photographed and then wind the mentioned film portion upon the wind-up spool. During this exposure of the portion of the film, the diaphragm of the camera is gradually closed from its starting actual exposure aperture to the smallest possible aperture, so as to produce in this manner a dissolving effect. During this time period of the procedure the camera shutter kept open.

After this has been accomplished, the camera shutter is closed and the above-mentioned portion of the film is withdrawn from the wind-up spool and returned to the delivery spool. For the purpose of returning the mentioned film, the film gripper is moved in a rearward direction and the wind-up spool and the delivery spool are connected with each other by a rearward winding mechanism, so that the mentioned wind-up spool and the delivery spool are rotated in a direction opposite to the forward movement of the film.

After the mentioned film portion has completed its rearward movement, this film portion is again exposed, namely, by photographing a new scene which becomes superimposed upon the previously produced scene and while this takes place, the diaphragm is gradually opened. For this purpose, the shutter is opened and the film gripper as well as the delivery spool and the wind-up spool are so operated that they move the film forwardly in a conventional manner. The diaphragm opens gradually from its smallest possible aperture to its actual aperture.

In this manner, it is possible to dissolve or fade one end of the scene with the start of the following scene. The requisite is, however, that the same length of film, namely, the same number of picture frames which was subjected to the fading procedure, must be moved rearwardly.

In order to accomplish this, it is necessary to employ a counter, so that the indication of the same at the beginning and at the end of the dissolving procedure may be determined by the camera operator, namely, that during the rearward movement the same number of picture frames is moved; or it is necessary to provide a special storage unit which controls after a predetermined time period or after a scanning of a predetermined number of picture frames, the rearward movement of the film.

In accordance with the invention, the motion picture camera is provided with a motor-driven diaphragm, and it is the object of the invention to insure that always the same length of film which was subjected to the dissolving procedure is moved rearwardly, but this is to be done without employing a special counter or storage unit.

It is an object of the invention that for the purpose of producing a dissolving effect, the forward and rearward movement of the portion of the film which, for instance, is accomplished by the film gripper which performs a forward and a rearward movement take place in dependence on the path of movement of the diaphragm when the same moves from an open position to an almost closed position and from the almost closed position again to the open position.

According to another object of the invention, the time period required for the diaphragm motor to move the diaphragm between its exposure position and its smallest aperture position is used as a measure or storage value for the dissolving procedure of the length of film which is withdrawn from the delivery spool and subsequently is again wound upon the latter.

Still another object of the invention is that a diaphragm control ring or an indicator element controlled by the latter and moving along the path between the exposure aperture and the smallest possible aperture is used as a measure or storage value for that portion of the length of film which is used for the dissolving procedure and is withdrawn from the delivery spool and is again wound upon the same.

These objects of the invention have the result that a special time unit is eliminated. In accordance with the invention, this is determined by the running time or the path of movement which is required by the diaphragm motor or the indicator disk in order that during the dissolving procedure, the diaphragm is adjusted from its actual exposure aperture to the smallest diaphragm aperture. In the event that the exposure aperture of the diaphragm has from the start such a small size that the running period of the motor will be too short in order to reach the smallest diaphragm aperture, then the present invention provides that for the purpose of extending the length of the path of movement of the diaphragm, there is arranged between the point of the exposure aperture and the smallest diaphragm aperture a simulating element which produces a smaller brightness of the exposure beam, so that the exposure diaphragm aperture has to be adjusted to a larger size. For this purpose, there are provided means which produce a corresponding correction of the beam of light which reaches and exposes the film in the camera.

The invention will now be described in greater detail with reference to the accompanying drawing in which:

FIG. 2 illustrates one embodiment in which a motion picture camera is provided with a motor-driven diaphragm; and FIG. 3 illustrates another embodiment of the motion picture camera of the invention.

Figure 1:
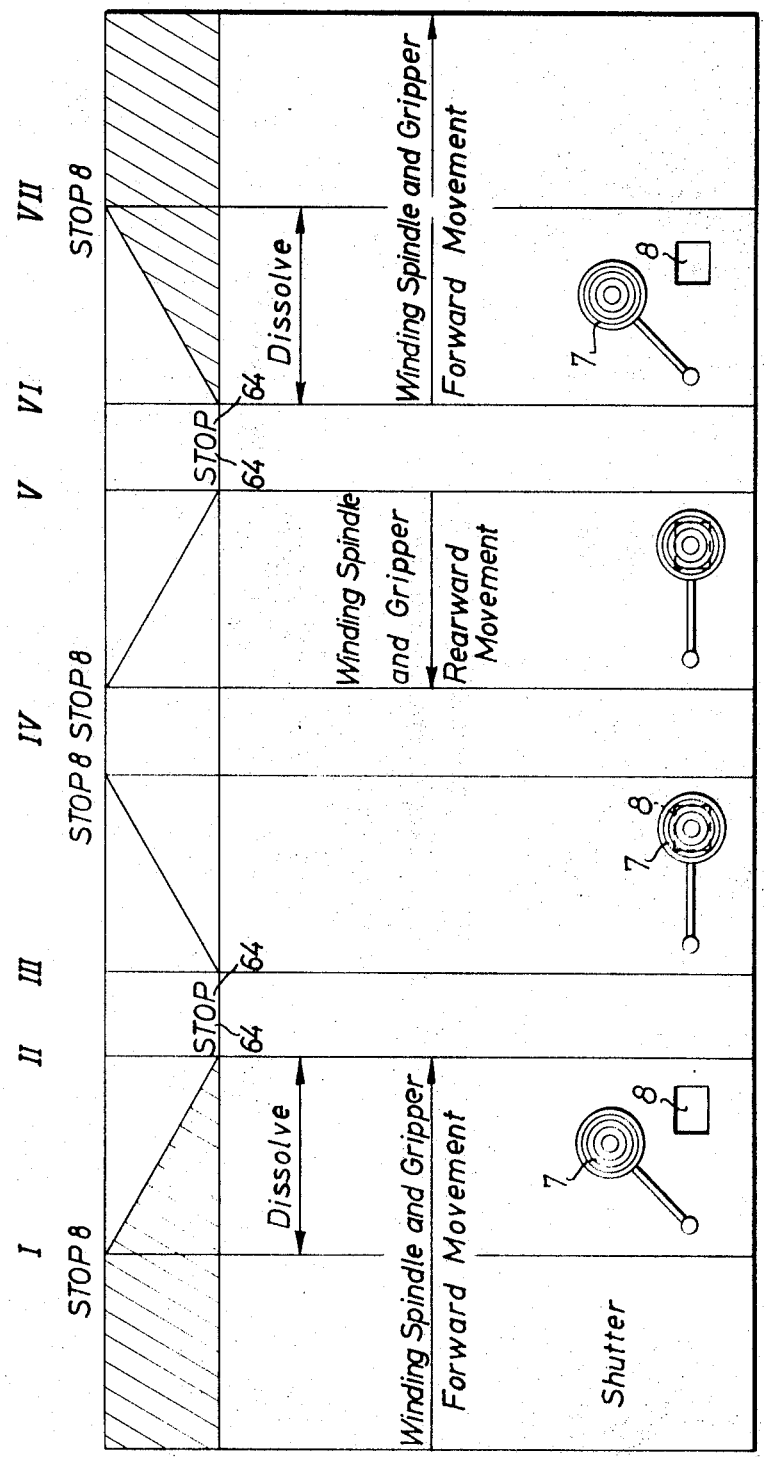
FIG. 1 illustrates diagrammatically by way of example a chart which indicates the various movements of the diaphragm with reference to the film gripper and the shutter of the motion picture camera.

Referring to FIG. 1, the chart indicates that up to the point of time I, a conventional picture-taking takes place. The diaphragm value or aperture may for instance be adjusted to "8" and at this particular period of time, the winding and gripper motor are operating and the shutter is open.

It is assumed that the operator uses a conventional motion picture camera in which the size of the diaphragm can be read by the operator. In addition, the ends of the diaphragm range are indicated, for instance by lamps of different color and/or position. For this purpose, as illustrated in FIG. 2, a diaphragm motor 1 by means of a gearing 1a drives the toothed diaphragm control ring 2 which is provided with the radially extending end stops 3 and 4 corresponding to the diaphragm aperture values "64" and "2.8" respectively, and at these stops are arranged the limit switches 5 and 6 which control the lamp indicators 23, 24 over the electric circuitry shown. For the present invention particularly, the end stop 3 for the smallest diaphragm value "64" is of importance.

At the point of time I, the camera operator depresses a dissolving key for initiating the dissolving or fading procedure. This has the result that the film gripper during the picture-taking operation continues to advance the film and withdraws it from the delivery spool. As indicated by the position of the shutter disc 7 and the picture window 8, the shutter is open. The diaphragm is adjusted from its actual exposure aperture, assumed to be stop "8" to its smallest aperture or stop "64." The dissolving operation is completed at II. The camera motor is stopped and the shutter is closed.

As soon as the camera operator recognizes by the diaphragm indication or the lighting of the indicator lamp in the end position that the diaphragm has been adjusted to its smallest aperture, which terminates the dissolving or fading operation he depresses at the point of time III, the release member and effects thereby an opening of the diaphragm while the exposure automatically is disconnected and the shutter is closed. As soon as this has been accomplished, a contact is operated at the point of time IV, so that the diaphragm motor is reversed to close the diaphragm again while the shutter remains closed and the film gripper and spools are caused to move the film rearwardly. The number of the picture frames to be moved rearwardly is determined itself, namely, from the period of time which is required by the diaphragm motor to move the diaphragm along the range from "8" to "64." This means that automatically as many picture frames are moved rearwardly as were advanced during the closing movement of the diaphragm between I and II.

At the point of time V, the diaphragm is again closed and the advanced film has again been returned to the supply spool. At the point of time V, the first phase of the dissolving or fading procedure which results in a gradual fading of the end of the photographing of a scene is completed. This is the result of a storing of the section of the film whose length corresponds to the end of the scene during the time period the diaphragm was operated and the rearward movement of the portion of the film containing the end of the photographed scene took place. At the point of time V, the camera motor is again stopped. The shutter is closed.

If the new scene is to be faded in or superimposed on the end of the preceding scene — at the point of time VI — the second phase of the dissolving procedure takes place during which the diaphragm is gradually opened while the new scene is photographed upon the end of the mentioned preceding scene. For this purpose, the camera operator depresses solely the camera release, so that the film gripper operates and both spools are operated in the forward direction, the shutter opens and the diaphragm opens from "64" to the actual exposure opening "8," while from VII on, the conventional operation of the motion picture camera can continue.

It may happen that the starting diaphragm aperture in view of the high brightness of the scene to be photographed is already closed to such an extent that the storage time which is determined by the running time of the diaphragm motor would be too short. In such a case, it is proposed that the exposure diaphragm aperture by pretending or simulating a lower brightness of the scene to be photographed is opened further, so that the extended running time of from this larger aperture size to the smallest aperture size may be used for the dissolving procedure. Accordingly, means are provided which correct the beam of light which reaches and exposes the film in the camera.

In practice this may be accomplished in motion picture camera of different type in a manner as will be explained hereinafter. It is assumed in this connection that all cameras operate with a non-variable shutter speed.

In motion picture cameras without an exposure meter and in which the diaphragm adjustment is selected by consulting a manual or separate exposure meter, the camera operator who desires to produce a dissolving or fading or mixing effect, will adjust the diaphragm of the camera arbitrarily to a larger diameter than the one indicated by the exposure measurement. The camera operator may proceed in the following manner: He mounts a filter in front of the photocell of the manual exposure meter, so that in view of the filter, the photocell will be energized with a reduced brightness. The exposure meter will indicate a larger diaphragm diameter than is required, and this diaphragm aperture value is transferred to the camera by adjusting the diaphragm of the latter accordingly. In order to avoid an over-exposure of the film at the beginning of the dissolving or fading procedure, it is necessary to insert in front or into the light beam coming from the subject to be photographed a suitably selected light-weakening member—preferably the same type of a filter as was arranged in front of the photocell of the exposure meter. In view of the foregoing, the camera operator has now established for the dissolving or fading procedure a lesser brightness than is available in practice.

In motion picture cameras with semi-automatic or coupled exposure meters in which the measurement takes place within the camera casing, it is necessary that a filter which weakens the beam of light is arranged in front of the photocell and also in the path of the beam of light which exposes the film in the camera.

In motion picture cameras with a completely automatic exposure determination and interior measurement of the light, it is necessary to arrange a light-weakening member of the required density in front or in rear of the camera objective.

FIG. 3 illustrates diagrammatically one embodiment of the invention which makes possible a time-saving during the performance of the first phase of the dissolving or fading procedure in which the operations III to IV are eliminated. In FIG. 3, the diaphragm motor 1 drives the diaphragm control ring 2 and an indicator disk 11, since these parts are operatively connected with each other by slip clutches or other releasable clutches 16 and 17. The indicator disk 11 carries a diaphragm aperture scale 12 which is adjustable relatively to a stationary index 15 on the camera casing, so that the adjusted diaphragm aperture can be read opposite the index 15. The operation of this arrangement is as follows:

In the point of time I, the indicator disc 11 is so arrested that the actual diaphragm value "8" is opposite the index 15. The diaphragm motor 1 rotates also by means of the clutch 16 the diaphragm adjusting ring 2 until the smallest diaphragm aperture "64" is reached, but the disk 11 remains stationary and the index 15 is opposite the indication "8."

The result is that the camera diaphragm has been adjusted to the aperture "64," while in the indicator disc 11, which remains stationary and points to "8," a value has been stored which is used for the rearward movement of the advanced length of the film.

The rearward movement of the film is effected by rotating the disc 11 by the motor 1 and the clutch 17. The disc 11 rotates until the stationary index 15 points to "64." The disc 11 also rotates at the same time the gripper 20 in the direction necessary for the rearward movement of the film either in a mechanical or electrical manner.

At the end of the rotation of the disc 11, the gripper 20 is stopped. Since now the camera diaphragm—ever since the point of time at II—indicates "64" and remains that way, it is now possible to perform with the camera the second phase of the dissolving or fading procedure without employing the time period between IV to V. The circuitry for accomplishing this is also shown in FIG. 3, where a take-up reel motor 22 for the magazine 21 is controlled by a switch 27, while the diaphragm motor 1 and a motor 20 for the film transport means are controlled by switches 25 and 26, respectively. For the gradually fading exposure of the first scene, the take-up motor 22 is stopped by opening the switch 27, and the transport motor 20 as well as the diaphragm motor 1 is rotated in such a direction that the film section to be subjected to superimposition of the second (different) scene is reeled off from the supply reel, subjected to the fading effect and stored in the form of a loop in the storage chamber in the camera.

At the same time the motor 1 over the clutch disc 17 rotates the indicator ring 11 until the diaphragm value "64" is opposite an index 15 on the camera. By means of a control projection (not shown) on the disc 11 the motor 26 is thereby reversed through shifting of the switch 20, so that it reverses the movement of the stored film section with the shutter closed. The motor 20 is then stopped by opening of the switch 26.

For superimposition of the second scene, motors 22 and 20 are then again changed to forwardly rotation by the respective switches 27 and 26, and the diaphragm motor 1 is switched to gradual increase of the diaphragm aperture from "64" to "8." During this last-mentioned operational phase, the position of the indicator disc 11 is inconsequential. It serves only the purpose of maintaining the selected maximum aperture indication during the fading movement of the film section. During normal filming operation it may advantageously be left at the 2.8 indication in order to avoid any influence on the transport motor 20.

The indicator disc 11 may also be provided with the diaphragm end contacts which in the embodiment of FIG. 2 were attached to the diaphragm control ring 2.

What we claim is:

1. In a motion picture camera having film transporting means adapted for subjecting a predetermined film section to a fading effect while moving it in a forwardly direction, reversing the movement of said film section, and then superimposing a different scene on said film section during renewed forwardly movement and increasing exposure intensity thereof, the improvement comprising a reversible diaphragm mechanism, a drive motor for said diaphragm mechanism, and means operatively connecting said diaphragm mechanism with said film transporting means, whereby operation of said diaphragm mechanism from a selected maximum to a minimum exposure aperture determines the length of said film section, and operation of said diaphragm mechanism from said minimum to said selected maximum exposure aperture causes movement in the reverse direction of exactly the same length of time.

2. The motion picture camera according to claim 1, in which said drive motor is reversible and said diaphragm mechanism includes a rotatable diaphragm aperture indicator disc, friction clutch means between said indicator disc and said drive motor, stop means for said indicator disk adapted to retain said indicator disc in the position corresponding to said maximum exposure aperture of the diaphragm mechanism during movement of the latter to said minimum exposure aperture, and to release said indicator disc for movement through the intermediary of said clutch means to the position corresponding to said minimum exposure opening of the diaphragm mechanism during movement of the latter to said minimum exposure opening.

3. The motion picture camera according to claim 1, including brightness reducing means insertable at said exposure opening, whereby, in case of too short a distance of movement of said diaphragm mechanism between said maximum and said minimum exposure aperture, a longer distance of movement is simulated.

* * * * *